United States Patent

Atwood et al.

[15] 3,659,452
[45] May 2, 1972

[54] LASER EXCITED SPECTROPHONE

[72] Inventors: John G. Atwood, West Redding; Edwin L. Kerr, Ridgefield, both of Conn.

[73] Assignee: The Perkin-Elmer Corporation, Norwalk, Conn.

[22] Filed: Apr. 22, 1969

[21] Appl. No.: 818,328

[52] U.S. Cl. ...................73/23, 73/15 R, 73/190 R, 250/43.5 R
[51] Int. Cl. ..........................................G01n 21/00
[58] Field of Search ............73/23, 15, 190, 432; 250/43.5

[56] References Cited

UNITED STATES PATENTS

| 3,105,147 | 9/1963 | Weilbach | 250/43.5 |
| 3,287,556 | 11/1966 | Good | 250/43.5 |
| 3,487,685 | 1/1970 | Shifrin | 73/190 |

FOREIGN PATENTS OR APPLICATIONS 953,952  4/1964  England..........................250/43.5

OTHER PUBLICATIONS

Apparatus for Measuring the Specific Heat of a Gas– D. L. Livesey– Univ. of Brit. Col.– Publ. 1964– in 73-190 publications Primary Examiner—Richard C. Queisser
Assistant Examiner—C. E. Snee, III
Attorney—Edward R. Hyde, Jr.

[57] ABSTRACT

A system for measuring the radiant energy absorptivity of gaseous samples. There is provided a laser source, a cell for containing the sample gas in the path of the radiation and a low frequency differential pressure transducer coupled to the sample cell. The laser beam is partially absorbed producing a pressure rise in the gas which is then measured.

5 Claims, 1 Drawing Figure

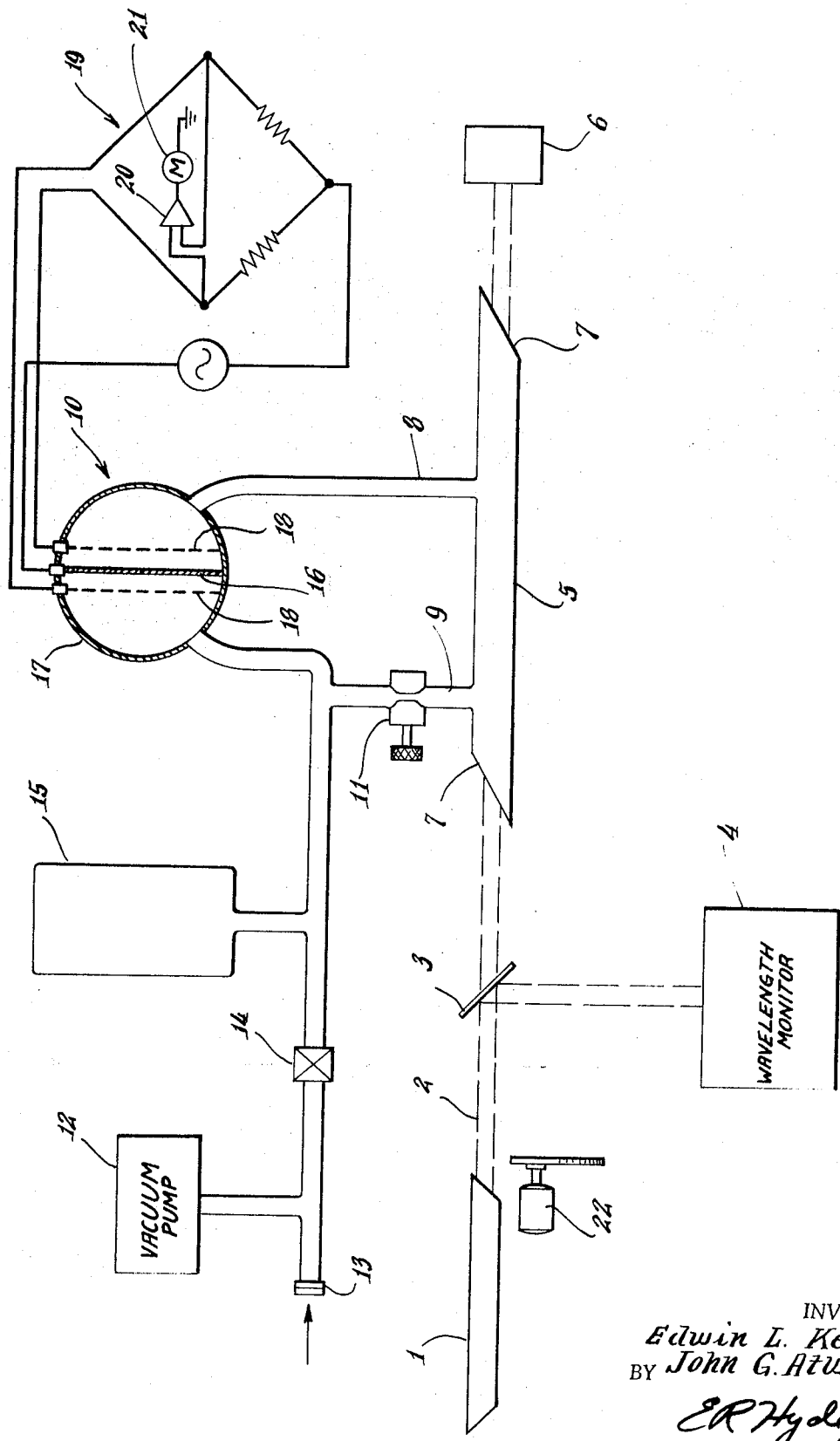

LASER EXCITED SPECTROPHONE

This invention relates to high sensitivity spectrometric analysis and is particularly directed to an instrument and method for precisely measuring the absorptivity of small quantities of gases having very weak absorptivity.

The development of laser communications and laser radars has stimulated interest in atmospheric absorption of laser beams. Absorptivities as weak as $10^{-8}$ cm$^{-1}$ are significant in some applications involving long path atmospheric transmission. Such weak absorptivities are difficult to measure either in the field or in the laboratory. Field measurements over long atmospheric paths are disturbed by atmospheric scattering and turbulence, and have very little control over the sample. In the laboratory, with conventional differencing absorbance spectrometers using long path cells, broad band absorptivities are difficult to distinguish from scatter or baseline drift. This is because conventional absorbance spectrometers measure the difference between incident and transmitted power and the difference is proportional to power removed from the source beam per unit length. Thus, the sensitivity of such instruments depends on the length of the sample. The present invention is directed to a system wherein the measured signal is independent of path length. Therefore, the measured signal is proportional to true absorptivity, that is, the rate at which the transmitting material converts the incident energy to thermal agitation.

Accordingly, it is an object of this invention to provide a method and apparatus for measuring very low levels of gaseous sample absorptivity.

It is also an object of this invention to provide a method and apparatus for producing a signal proportional to true absorptivity of a gaseous sample.

Another object of this invention is the provision of a method and apparatus for determining the quantity of very low concentrations of impurities in a gaseous sample.

A further object of this invention is the provision of a method and apparatus for determining the absorptivity of impurities in a gaseous sample which are of very low absorptivity.

It is also an object of this invention to provide a method and apparatus for measuring absorptivity in gas samples wherein scattering is much greater than absorptivity.

A specific object of this invention is the provision of a method and apparatus of sufficient sensitivity to permit the study of multiple-photon absorption processes.

Briefly, in accord with one embodiment of this invention, we provide a system for measuring absorptivity which includes a source of coherent radiation, a cell for containing the sample gas in the path of the radiation and a low frequency differential pressure transducer coupled to the sample cell. The method includes the steps of selecting a source of radiation having a wavelength matching that of an absorption line or band of the gas which is to be detected, passing the beam of radiant energy through a cell containing the sample so that energy absorbed from the beam produces thermal motion which, in turn, produces a pressure rise. The measured value of the resulting pressure rise is proportional to the absorptivity of the sample at the selected wavelength.

Further objects and advantages of this invention will become apparent as the description and illustration thereof proceed. The novel features believed characteristic of the invention are set forth in the appended claims; a detailed understanding may be had by reference to the following description, taken in connection with the appended drawings, in which:

FIG. 1 is a schematic diagram of a system in accordance with the present invention.

As shown in FIG. 1, the apparatus comprises a source of coherent radiation 1 which is preferably a laser. The output wavelength of the laser is selected according to the material which is to be measured in the sample. Thus, any of the wide variety of available lasers may be selected or the recently developed tunable types of lasers may be used. If the laser selected is of the continuous-wave type or of the quasi-continuous-wave type, a chopper wheel 22 for alternately transmitting and interrupting the laser beam 2 is provided which revolves at a rate approximately three times the time required for the pressure response to rise to its steady state value. The beam 2 produced by the laser is directed onto a beamsplitter 3 which extracts a small proportion thereof and directs it to a system for monitoring and, if required by the characteristics of the particular selected laser, stabilizing the output wavelength of the laser. The remainder of the beam is directed into a sample cell 5 and, after passing through the cell, the beam is received by a power or energy monitor 6. The sample cell comprises any suitable small diameter tube for containing the sample to be tested. The length of the cell is not critical as it must only be sufficiently long to prevent any noticeable effect due to heating of the end windows 7. The cell is closed by the windows 7 which are disposed at Brewster's angle to reduce loss of the beam, and are fabricated of a material which is as transparent as possible to the laser radiation.

The remainder of this system comprises a means for accurately measuring the rate of pressure rise due to absorptivity. This system comprises a pair of tubes 8 and 9 connected to cell 5 and to opposite sides of a capacitance manometer 10. A pressure nulling valve 11, preferably of the micrometer type, is provided which may be opened when the system is evacuated and then filled with the sample and then shut down to a very small opening. This opening should be so small that a pressure rise in the cell 5 is not transmitted through tube 9 until a long time interval after it has been transmitted through tube 8. This permits the manometer 10 to indicate the value of each pressure change. At the same time, the small leak provided by the small opening in the micrometer valve automatically rebalances the system if the measurements are spaced by the selected interval. This compensates for the average heating of the cell over many operations and prevents long term pressure buildup. The system is also coupled to a vacuum pump 12, a sample gas inlet 13, a shut-off valve 14 and a ballast tank 15 which provides a constant reference pressure for the system.

The manometer may comprise any suitable differential pressure measuring device of high sensitivity and sufficiently rapid response. In a preferred embodiment, a thin sealed stretched steel diaphragm 16 is mounted in chamber 17, the two sides of which are connected to tubes 8 and 9. Two perforated electrode plates 18 are provided to form capacitors with the diaphragm. These are connected in a calibrated A. C. bridge 19. Readout is provided by means of unit 20 and meter 21.

In operation, activation of the laser, which may be of either the continuous or pulsed operation type, produces a beam of radiation which enters the sample cell and is absorbed according to the absorptivity and pressure of the gaseous sample to be measured which is present. Due to the variable leak valve 11, the rapid pressure rise due to absorptivity and heating is rapidly communicated only to the capacitance monitor via the tube 8. Thus, an output is produced by the A. C. bridge of the manometer which is proportional to the pressure rise and thus, directly proportional to the absorptivity. The A. C. bridge output is indicated by a suitable amplifying, rectifying and phase referencing circuit 20, and a calibrated meter 21. This meter reading can then be directly converted into a measure of the absorptivity of the sample gas present.

A particular feature of this invention is the independence of the measurement from the length of the sample chamber. This is because the measured pressure change arises from the absorptive heating which occurs in the sample. In fact, the operation of this apparatus is based on the fact that the thermal expansion produced in the sample by introduction of the laser beam very quickly spreads equally throughout the sample and into one side of the manometer chamber and produces an expanded condition which is measured by the manometer. Further extension of the length of the sample through which the beam travels would increase the total heat absorbed and the volume into which the thermal expansion occurs by substantially the same amount and thus, would not affect the sensitivity of the measurement, except insofar as it reduces the effects of heat introduction by the end windows.

It is noted that the use of the term "steady state" in this discussion is intended to denote the fact that the thermal expansion after spreading through the cell 5 and tube 8, produces a maximum pressure rise for a time which is greater than the response time of the manometer. Within a few seconds after the laser beam is extinguished, cooling through the walls of the cell and leakage through the adjustable valve 11 reduce the pressure to the reference value. In the meantime, however, a measurement is obtained.

The method and apparatus of this invention have been found to be effective in measuring absorptivities which have previously been too small for accurate measurement. In addition to the straightforward measurement of small quantities of low-absorptivity gases, this invention is also capable of measuring the absorptivity of gases in which scattering levels are normally so high as to obscure the absorptivity effect; this is readily done by means of the present system since the scattered light does not in any way affect the thermal expansion due to absorption. Furthermore, this system is capable of measuring the absorptivity due to multiple-photon absorption processes. These values are so low that they cannot be accurately studied with conventional instruments.

It will be clear to those skilled in the art that many changes and modifications can be made from the specific embodiment described above without departing from the concept upon which this invention is based. Accordingly, it is intended that the appended claims include all such modifications and changes as fall within the true scope of this invention.

What is claimed is:

1. Apparatus for making spectroscopic measurements of very low absorptivity gaseous samples comprising:

an elongated sample cell for containing a gas sample and having transparent windows at opposite ends of its longitudinal axis;

a laser source of coherent radiation having a wavelength matching that of an absorption band of a gas to be detected, said laser source being aligned for directing its beam of radiation longitudinally through the cell;

differential pressure measuring means having a chamber in two parts for measuring a difference between the pressures of gas in the respective parts;

a gas flow conduit from the sample cell to one part of said chamber and another gas flow conduit from the cell to the other part;

a third gas flow conduit connectable to a source of sample gas and connected into said other part of the chamber, and incorporating shut-off means and ballast means for providing a constant reference pressure in said other part of the chamber; and valve means in said other conduit adapted to be opened for admitting sample gas into the cell and to be closed down to a small passage therethrough such that a rise in gas pressure in the cell is not transmitted to said other part of said chamber until after a rise in gas pressure is transmitted to the one part of the chamber through said gas flow conduit, whereby the temperature and hence the pressure of a gas in the cell is increased by absorption of radiation from the laser source of the same wavelength as the absorption band of said gas.

2. The apparatus of claim 1 including means for monitoring the wavelength of radiation from said laser source.

3. The apparatus of claim 1 including means for successively transmitting and interrupting a beam of radiation from the laser source to the cell a rate approximately three times the time required for an increase in gas pressure in the cell due to absorption of radiation from the laser source to increase to a steady state value.

4. The apparatus of claim 3 in which said transmitting and interrupting means comprises chopping means for intercepting a beam of radiation from the laser source.

5. The apparatus of claim 1 including energy monitoring means receiving the portion of a beam of radiation from the laser source that emerges from the cell.

* * * * *